(12) United States Patent
Carlsson et al.

(10) Patent No.: US 9,542,471 B2
(45) Date of Patent: Jan. 10, 2017

(54) METHOD OF BUILDING A GEO-TREE (75) Inventors: Richard Carlsson, Stockholm (SE);
Henrik Makitaavola, Luleå (SE); Tor Bjorn Minde, Gammelstad (SE);
Simon Moritz, Stockholm (SE);
Hjalmar Olsson, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 263 days.

(21) Appl. No.: 13/977,737

(22) PCT Filed: Dec. 30, 2010

(86) PCT No.: PCT/IB2010/003489
§ 371 (c)(1),
(2), (4) Date: Jun. 30, 2013

(87) PCT Pub. No.: WO2012/090017
PCT Pub. Date: Jul. 5, 2012

(65) Prior Publication Data
US 2013/0290332 A1 Oct. 31, 2013

(51) Int. Cl.
G06F 17/30 (2006.01)
(52) U.S. Cl.
CPC ..... *G06F 17/30595* (2013.01); *G06F 17/3087* (2013.01); *G06F 17/30241* (2013.01); *G06F 17/30265* (2013.01); *G06F 17/30961* (2013.01); *G06F 17/30991* (2013.01)
(58) Field of Classification Search
CPC ............ G06F 17/30265; G06F 17/3082; G06F 17/3087; G06F 17/30991; G06F 17/30601; G06F 17/30241; G06F 17/30041
See application file for complete search history.

(56) References Cited

U.S. PATENT DOCUMENTS

| 8,312,024 | B2 * | 11/2012 | Martin Cervera et al. ... 707/748 |
| 8,347,202 | B1 * | 1/2013 | Vespe ............... G06F 17/30241 715/200 |
| 2004/0254718 | A1 * | 12/2004 | Cheon .................. G01S 5/0284 701/454 |
| 2005/0060299 | A1 * | 3/2005 | Filley ................ G06F 17/30265 |
| 2005/0273725 | A1 * | 12/2005 | Russon ............. G06F 17/30265 715/780 |
| 2006/0026184 | A1 * | 2/2006 | Hewing ........... G06F 17/30749 |

(Continued)

FOREIGN PATENT DOCUMENTS

WO 2009064996 A2 5/2009

OTHER PUBLICATIONS

International Search Report (PCT/IB2010/003489 [Priority Application]) Sep. 22, 2011.
Written Opinion (PCT/IB2010/003489 [Priority Application]) Jan. 21, 2013.
International Preliminary Report on Patentability (PCT/IB2010/003489 [Priority Application]) Mar. 14, 2013.

(Continued)

*Primary Examiner* — Alicia Willoughby
(74) *Attorney, Agent, or Firm* — Patent Portfolio Builders PLLC (57) ABSTRACT A method of building a geo-tree includes collecting a plurality of data items having geographic and contextual tags, associating the geographic tags with the contextual tags, clustering the collected data items based on the contextual tags, classifying the clusters based on the contextual tags, building a geo-tree with each classified cluster being associated with a node on the tree and storing the geo-tree.

17 Claims, 4 Drawing Sheets

(56) References Cited

U.S. PATENT DOCUMENTS

| | | | | |
|---|---|---|---|---|
| 2006/0270419 | A1* | 11/2006 | Crowley | H04L 12/58 455/456.2 |
| 2007/0271297 | A1* | 11/2007 | Jaffe et al. | 707/104.1 |
| 2008/0201638 | A1* | 8/2008 | Nair | H04L 67/38 715/706 |
| 2008/0313039 | A1* | 12/2008 | Altberg | G06Q 20/10 705/14.54 |
| 2009/0132469 | A1* | 5/2009 | White et al. | 707/2 |
| 2009/0279794 | A1* | 11/2009 | Brucher | G06F 17/30241 382/225 |
| 2009/0324211 | A1* | 12/2009 | Strandell | G01S 5/0045 396/310 |
| 2010/0029299 | A1 | 2/2010 | Riise et al. | |
| 2010/0046842 | A1* | 2/2010 | Conwell | G06F 17/30265 382/218 |
| 2010/0106801 | A1 | 4/2010 | Bliss et al. | |
| 2010/0205176 | A1* | 8/2010 | Ji | G06K 9/00704 707/737 |
| 2010/0250136 | A1* | 9/2010 | Chen | G06F 17/30247 701/300 |
| 2010/0268720 | A1 | 10/2010 | Spivack et al. | |
| 2011/0071881 | A1* | 3/2011 | Zheng | G06Q 30/02 705/7.34 |
| 2011/0072015 | A1 | 3/2011 | Lin et al. | |
| 2011/0264664 | A1* | 10/2011 | Xiao | G06F 17/30613 707/741 |
| 2011/0314016 | A1 | 12/2011 | Svendsen | |

OTHER PUBLICATIONS

Cao, Liangliang et al. "A Worldwide Tourism Recommendation System Based on Geotagged Web Photos", 2010 IEEE International Conference on Acoustic Speech and Signal Processing (ICASSP), Mar. 2010, Abstract and Fig. 1.

Lieberman, M. D. et al. "Geotagging With Local Lexicons to Build Indexes for Textually-Specified Spatial Data", 2010 IEEE 26th International Conference on Data Engineering (ICDE), Mar. 2010, Abstract and Section III.

Ahern, Shane et al. "Visualizing Aggregate Data From Unstructured Text in Geo-Referenced Collections", JCDL '07: Proceedings of the 7th ACM/IEEE-CS Joint Conference on Digital Libraries, Jun. 18, 2007, Abstract.

Mamei, M et al. "Automatic Analysis of Geotagged Photos for Intelligent Tourist Services", 2010 Sixth International Conference on Intelligent Environments (IE), Jul. 19-21, 2010, Abstract and Section V.

Qiang Yang; "Clustering"; Hong Kong University of Science and Technology; pp. 1-54.

Extended European Search Report in corresponding European Application No. 10 861 471.0 dated Sep. 22, 2016.

C. Vens, et al.; "Decision tress for hierarchical multi-label classification"; Machine Learning, Kluwer Academic Publichsers-Plenum Publishers, NE; vol. 73, No. 2; XP019646600; Aug. 1, 2008; pp. 185-214.

* cited by examiner

METHOD OF BUILDING A GEO-TREE

TECHNICAL FIELD

This invention relates to building a geo-tree with nodes.

BACKGROUND

The tagging of data with geographic information is becoming increasingly common. Geo-tagging involves adding information about geographical positions to any kind of data to indicate the relationship between data and a physical place. Geo-tagging can be useful for many purposes. Some examples include: being able to search for the data in a geographical context such as searching for pictures taken close to a particular location; for visualizing data on a map such as searching for newspaper articles about a part of a city on a map of the city.

Geo-tagging can be performed manually where a person manually tags data with the geographical areas that relate to the data. This can be done when the data is created or by manually going through data and tagging it. Manual geo-tagging gives high accuracy, meaning that the data is typically associated with a relevant geographical position.

Geo-tagging can also be performed automatically where a machine controlled by an algorithm analyzes the data and tags it with geographical positions that relates to the data.

Several methods can be used when analyzing data to find any geographical positions related to the data. Some of these methods include: (1) content based classification, (2) domain based classification and (3) location determined by an IP (internet protocol) address.

In content based classification, text is analyzed and matched to a list of geographical positions such as city names, country names, street names, etc. If a city name is included in a text, for example, the text is determined to be related to that city.

Under domain label classification, content located on the internet at a particular website can be assumed to be relating to a country corresponding to the address of the website that includes a country code. That is, for example, websites in Sweden include the country designation .SE in the web address.

In location determined by IP address, IP addresses of hosts of data are distributed in series corresponding to geographical areas. Therefore, by looking at the IP address of a host, it is possible to make assumptions about the geographical area to which the text corresponds.

Each of these methods has certain drawbacks. Content based classification, for example, relies on a machine being able to automatically determine whether a word is an indicator of a geographical position. In order to make this determination, existing solutions rely on comparing words to a list of place (names). A problem with this approach is that such lists most often only include the official name of a place. Alternative names such as slang or popular references are not part of such lists (e.g. "Sergels Torg" in Stockholm is sometimes referred to as "Plattan" and "New York" is sometimes referred to as the "Big Apple"). Consequentially, existing solutions have problems identifying these types of geographic words.

In many texts, information relating to many different places may be present. That is, for example, a section of text could include the words "Boston", "Stockholm", "Copenhagen", "Södermalm", and "Skanstull". These words represent a reference to a place and judging from the separate words it is difficult for an algorithm that matches words to positions to determine the relationship between the text and a place.

Some words are geographically ambiguous. They may refer to many different places. For example, "Vasastan" may refer to a place in Goteborg, Sweden and to a place in Stockholm, Sweden. Therefore, it is difficult for an algorithm that matches words to positions to determine the relationship between the text and a place.

SUMMARY

An object of the invention is to enable categorization of incompletely tagged data.

In an exemplary embodiment, a method of building a geo-tree is disclosed. The method includes collecting a plurality of data items having geographic and contextual tags, associating the geographic tags with the contextual tags, clustering the collected data items based on the contextual tags, classifying the clusters based on the contextual tags, building a geo-tree with each classified cluster being associated with a node on the tree and storing the geo-tree on a computer readable medium. Hereby is achieved that a geo-tree is built and a node of the geo-tree contains data that is geographically clustered and identified by contextual information. Once the geo-tree is built, if a data item is received that is tagged with contextual information, the data could be properly categorized into an appropriate cluster based on its contextual tag.

Data items may be collected from a data source or from a number of data sources. The associated data may be stored. The geographic tags include location co-ordinates and the contextual tags include descriptive terms. Clustering includes identifying a number of geographic tags associated with a contextual tag and calculating an area of a place associated with the contextual tag. A first cluster may be included within a second cluster if a certain percentage of the area of the first cluster is included in the area of the second cluster. A name may be associated with each cluster. A data item having a contextual tag is assigned to a cluster in the geo-tree including data items not having a geographic tag.

In another exemplary embodiment, a user equipment is disclosed. The user equipment includes a transceiver for communicating data, a memory for storing a plurality of data items having geographic and contextual tags and a processor. The processor associates the geographic tags with the contextual tags, clusters the collected data items based on the contextual tags, classifies the clusters based on the contextual tags and builds a geo-tree with each classified cluster being associated with a node on the tree.

The transceiver receives the data items from a database over a network and transmits the geo-tree to a database over a network. A data item without a geographic tag assigned to a cluster in the geo-tree having a contextual tag. The processor assigns a data item with a contextual tag to a cluster in the geo-tree based on the contextual tag associated with the data item.

In a further exemplary embodiment, a computer program is disclosed. The computer program includes computer readable program modules. When the program is run on a user equipment, it causes the user equipment to collect a plurality of data items having geographic and contextual tags, associate the geographic tags with the contextual tags, cluster the collected data items based on the contextual tags, classify the clusters based on the contextual tags and build a geo-tree with each classified cluster being associated with a node on the tree. The computer program may be contained in a computer readable medium.

In other exemplary embodiments, a server is disclosed. The server includes a communication interface for communicating data, a memory for storing a plurality of data items having geographic and contextual tags and a processor for associating the geographic tags with the contextual tags, clustering the collected data items based on the contextual tags, classifying the clusters based on the contextual tags and building a geo-tree with each classified cluster being associated with a node on the tree.

The word "plurality" shall throughout the descriptions and claims be interpreted as "more than one".

BRIEF DESCRIPTION OF THE DRAWINGS

The several features, objects, and advantages of the invention will be understood by reading this description in conjunction with the drawings, in which.

DETAILED DESCRIPTION

The following description of the implementations consistent with the invention refers to the accompanying drawings. The same reference numbers in different drawings identify the same or similar elements. The following detailed description does not limit the invention. Instead, the scope of the invention is defined by the appended claims.

According to exemplary embodiments, a system and method for building a geo-tree is disclosed. A geo-tree may be a logical tree with nodes containing geographic information. The geo-tree may be a hierarchical tree that describes a particular content.

Data items can be tagged with geographic location information (or geo tags or geo data) and contextual information (or context tags or context data). An example of a data item may be a media item in the form of digital images and movie clips.

Another example of a data item that may be tagged with geographical location information and contextual information is data associated with a mobile or embedded/fixed sensor of any kind adapted to be connectable to a communications network. An example of such a sensor is a temperature sensor installed in a building, which temperature sensor may be associated with a data item in the form of a file or record in a sensor database. In that case the data item may for example comprise the geographical location information as geographical coordinates for longitude, latitude and/or altitude.

Alternatively or in addition thereto the geographical location information may comprise a street address, building name, floor level, room name, IP-address etc. Context information could in the case of this temperature sensor example comprise information about the owner of the sensor, name of sensor, sensor version, date of last update, date of last connection to the communications network, purpose and/or category of the sensor (here temperature sensor), highest or lowest temperature measured by the sensor, average temperature measured by the sensor, temperature measurement intervals, date of installation of the sensor, name of building that the sensor is mounted in, name or number of the floor in the building that sensor is mounted, name or number of the room where the sensor is mounted, amount of data transferred from the sensor to the communications network etc. As understood by the person skilled in the art, the examples of contextual information mentioned above for the temperature sensor could be used in an analogous manner for other types of sensors independently of their complexity. Examples of other sensors may be velocity sensors and accelerometers embedded in vehicles, image sensors (such as cameras) installed in a vehicle, mobile telephone or in a building, and energy consumption sensors installed in a vehicle, mobile telephone or in a building.

Figure 1:
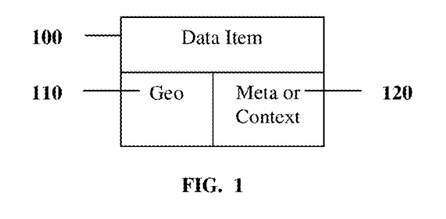
FIG. 1 illustrates an exemplary data item.

An exemplary data item is illustrated in FIG. 1. Data item 100 may have geo tag 110 and context tag 120 associated with it. A geo tag may include location information (e.g. of the subject of the media item) such as geographical coordinates for latitude, longitude and/or altitude. A context tag may include descriptive terms (e.g. of the data item) such as a place name, subject description, etc.

Figure 2A:
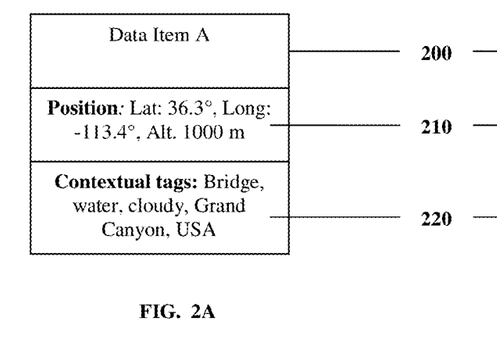
FIGS. 2A-2D illustrate exemplary images having geographic and contextual tags.
Figure 2B:
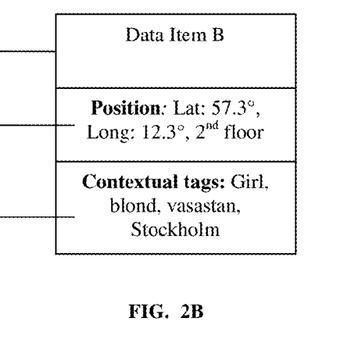
Figure 2C:
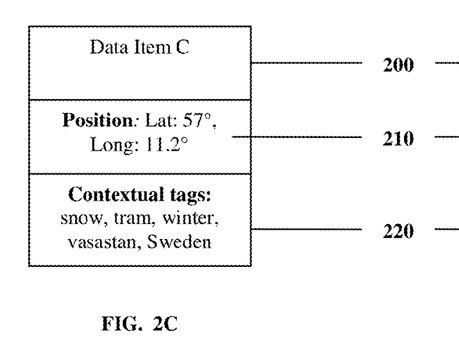
Figure 2D:
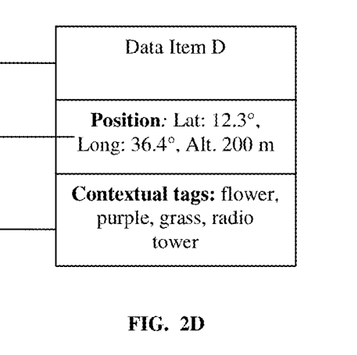

Exemplary data items are illustrated in FIGS. 2A-2D. One example of a data item as described above may be a media item. A data item 200 may be associated with geo data 210 and context data 220. If data item A of FIG. 2A is an image, then the image may represent a bridge near the Grand Canyon for example. The subject of this image (i.e. Grand Canyon or a bridge) can be included in the context tag. The location of the bridge can be represented by the geo tag using latitude, longitude and altitude coordinates.

In general, exemplary embodiments may include collecting data, clustering the collected data, classifying the clusters and building a geo tree.

Data may here be collected from an available database of items tagged with geographic and context information. In this context, "collected" could indicate that data is "received". Media items, for example, are available and can be accessed or collected from databases over the internet. Any archive having data tagged with location (geo) information and context information could be used to collect the data. The database of items need not be limited to being accessible over the internet—it could also be available offline.

Context tags (i.e. words or terms) may be associated with geo tags (i.e. location information) as the data is being collected. This information (in the form of a table for example) may be stored in a database. Utilizing the data items of FIGS. 2A-2D for example, the term "bridge" may be associated with a location having latitude of 36.3°, longitude of −113.4° and altitude of 1000 meters respectively. That is, "bridge" may be associated with 36.3°, −113.4°, 1000 m. Similarly, the term for a geographical area "Vasastan" may be associated with 57.3°, 12.3°. The term "flower" may be associated with 12.3°, 36.4°. The term "Vasastan" may also be associated with 57°, 11.2°.

The process (i.e. of associating context tags and geo tags) may be repeated until the data collection from a particular source is completed. This process could potentially result in a (particular) context tag being associated with multiple geo tags (i.e. location co-ordinates).

For example, a context tag for a city name may be associated with multiple geo tags each representing a different point within the city. The location co-ordinates may be specified in terms of a tenth of a degree of latitude/ longitude and height above sea level in meters or may also be specified utilizing other levels of granularity (whole degrees, degrees and minutes, degrees with minutes and seconds, etc.).

Similarly, a (particular) geo tag (i.e. location co-ordinate) may also be associated with multiple context tags. For example, a location co-ordinate may be associated with a street, a neighborhood or part of a city, a city, a state, a country, etc. Again, this may depend on the level of granularity used for the location co-ordinates.

A cluster analysis on the collected context tags may be performed to determine if the context tags are positioned in clusters. This may take place if multiple geo tags are associated with a context tag.

Each cluster of positions may be used to calculate an approximate area of the place associated with the context tag. The area of a cluster may be computed by connecting all the location co-ordinates associated with a particular context tag for example.

Multiple location co-ordinates may be associated with a context tag representing a large area or a large city such as "New York" for example. The multiple co-ordinates may be used as a "border" to determine the area corresponding to New York in this example. In some embodiments, a distance between contextual tags (i.e. between location co-ordinates corresponding to the contextual tags) may be computed and if the distance falls below a pre-determined threshold, then the context tags may be considered to be within a cluster.

Certain contextual tags may not have clusters. This may occur if only a single location co-ordinate is associated with a context tag for example. This may also occur with generic context tags which may be associated with (vastly) different geo tags. For example, the context tag "flower" may be associated with multiple geo tags in the world. As a result, it would be hard to classify this context tag into a cluster. In this case, this context tag may be considered not to be associated with a geo tag.

Associating context tags and geo tags may result in the context tags being spread out on a map creating different density groups based on the geographical position (geo tag) and text description (context tag). A hyperplane may be identified and used to separate the density groups into clusters. Other approaches for clustering data may include K-means clustering, hierarchical clustering, Euclidean clustering, etc.

The process (of identifying a hyperplane and the clusters) may be an iterative process. Initially, big regions may be separated from each other (similar to building from top down). Initially, the hemispheres (southern and northern) or eastern and western portions of the world may be separated from each other for example. Similarly, continents or countries may be separated from each other.

Subsequently, a more detailed or smaller area hyperplane may be identified for further separating the densities into smaller clusters. As a result, some clusters may be included within other clusters. For example, the cluster for Sweden may be included within the cluster for Europe. The country cluster (such as Sweden) may include clusters for cities (Stockholm, Gothenburg or Goteborg, Malmo, etc.) within Sweden.

If a first cluster overlaps more than a predetermined percentage of a second cluster, then the second cluster may be considered as belonging to the first cluster. This may be true for a neighborhood in a city where the cluster for the neighborhood may be considered to be part (or, mostly part) of the cluster for the city. The predetermined percentage may be 70% for example.

The node (cluster) for "Sweden" may have multiple nodes (clusters) "below" it in the geo-tree such as "Stockhom", "Goteborg", "Lund", "Lulea", "Linkoping" etc. (cities in Sweden for example).

The clusters may then be classified. Classification in this context involves "naming" of the cluster. Each cluster may be classified by the context tag. A cluster may be classified as "Stockholm". Clusters within Stockholm may include "Vasatan" or "Gamlastan", etc. (neighborhoods in Stockholm for example).

When the clusters have been classified, the geographical tree with tags may be built or created. The geographic tree may be stored on a computer readable medium such as, but not limited to, a database for example. The database may be associated with a server. Each context tag may have a hierarchical path connecting it to other context tags. The context tag "Vasastan" may have two paths: Vasastan-Gothenburg-Sweden and Vasastan-Stockholm-Sweden. Some examples of a hierarchical geo tree structure may include: "Sweden" includes "Goteborg" which includes "Vasastan" (Vasastan, Goteborg) and "Sweden" includes "Stockholm" which includes "Vasastan" (Vasastan, Stockholm); "New York" includes "Madison avenue"; "India", etc.

Figure 3:
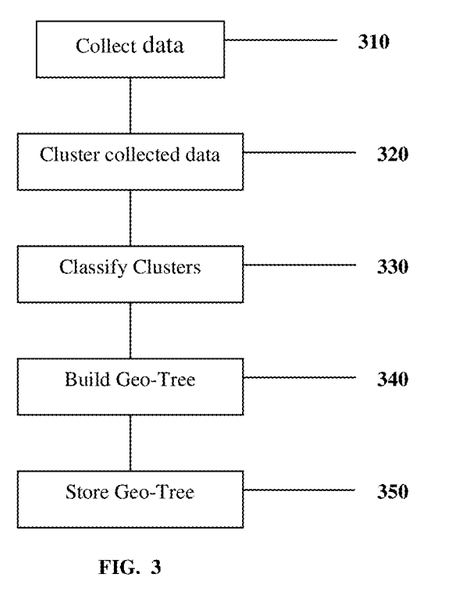
FIG. 3 illustrates a method in accordance with exemplary embodiments.

A method in accordance with exemplary embodiments is illustrated in FIG. 3. Data may be collected at step 310. Clusters for the collected data may be determined at 320. The clustered data may be classified at 330. A geo-tree based on the classified data may be built at 340. The geo-tree may be stored on a computer readable medium at 350.

The geo-tree may be used to rate the geographical meaning and importance of text content that has not been geographically tagged. That is, if a text contains both the words "Vasastan" and "Göteborg", "Vasastan" may be assumed to be referring to Vasastan in Göteborg and not Vasastan in Stockholm.

Once the geo-tree is created, it may be utilized to classify content that does not have geographic tags associated therewith. That is, the geo-tree may be utilized to automatically identify words that have a geographic importance in a text description metadata and then to classify the content to the highest relative geographic position. That is, a data item that is only tagged with contextual data (and not geographic data) may be associated with a node based on context data after the geo-tree has been built and establish a geographic context for the data item.

Figure 4:
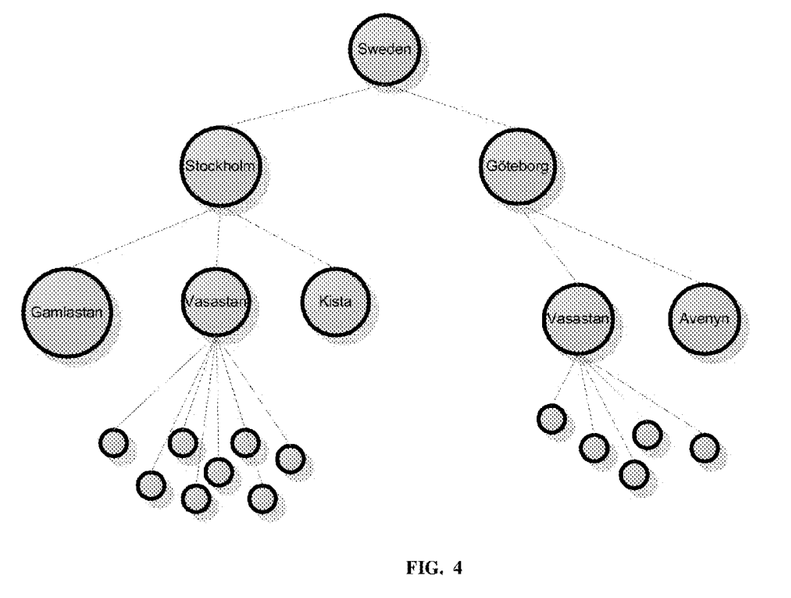
FIG. 4 illustrates a geo-tree in accordance with exemplary embodiments.

A geo-tree in accordance with exemplary embodiments is illustrated in FIG. 4. Cluster "Sweden" includes clusters "Stockholm" and "Goteburg" for example. Each of these include other cluster such as "Gamlastan", "Vasastan" and "Kista" for Stockholm and "Vasastan" and "Avenyn" for Goteborg for example.

Each cluster may also have a cluster score which may simply be the same as the level in the geo-tree. In FIG. 4, for example, the cluster score of "Vasatan" may be "2" and that of "Stockholm" may be 3. The clusters under "Vasatan" (representing smaller clusters within Vasatan for example) may have a cluster score of 1.

Figure 5:
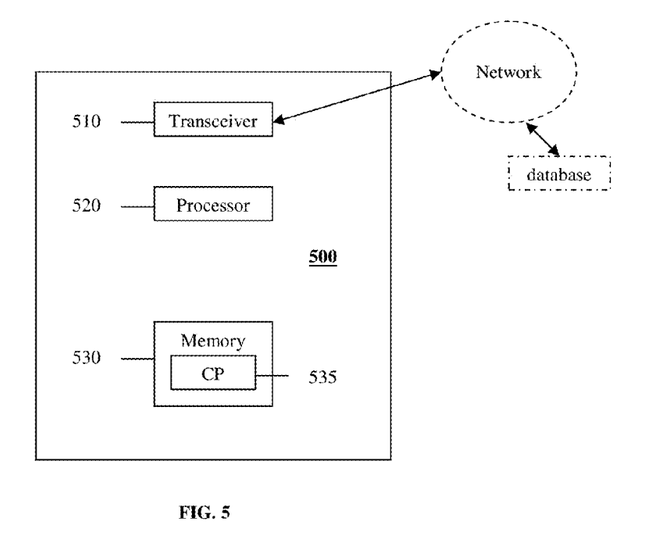
FIG. 5 illustrates a user equipment in accordance with exemplary embodiments.

A user equipment such as a mobile computing device may build a geo-tree in exemplary embodiments; it may also be built in a server at a network node. The data may be available in the computing device or server respectively or it may be obtained from a database. A user equipment 500 is illustrated in FIG. 5. Such a user equipment may be a mobile telephone or a portable computing device for example.

The user equipment 500 may include, inter alia, transceiver 510, processor 520 and computer readable medium 530 in the form of a memory. A plurality of data items having geographic and contextual tags associated therewith may be available in memory or it may be downloaded from a database over a communications network such as a cellular communication network in the form of a Long Term Evolution (LTE) network and/or the Internet for example. Once the data items are available to the user equipment 500, the processor 520 may perform the collection, clustering, classification and the building of the geo-tree in the manner described above according to exemplary embodiments.

In one embodiment, in order for the processor 520 to be able to perform the steps illustrated in FIG. 3, the memory comprises a computer program (CP) 535 with computer program modules which when run by the processor 520 causes the mobile communication device to perform all or some of the steps illustrated in FIG. 3. The memory may for example be a flash memory, a RAM (Random-access memory) ROM (Read-Only Memory) or an EEPROM (Electrically Erasable Programmable ROM), and the computer program modules described above could in alternative embodiments be distributed on additional memories (not shown) in the user equipment 500. The processor may not only be a single CPU (Central processing unit), but could comprise two or more processing units in user equipment 500. For example, the processor may include general purpose microprocessors, instruction set processors and/or related chips sets and/or special purpose microprocessors such as ASICs (Application Specific Integrated Circuit). The processor may also comprise board memory for caching purposes.

Figure 6:
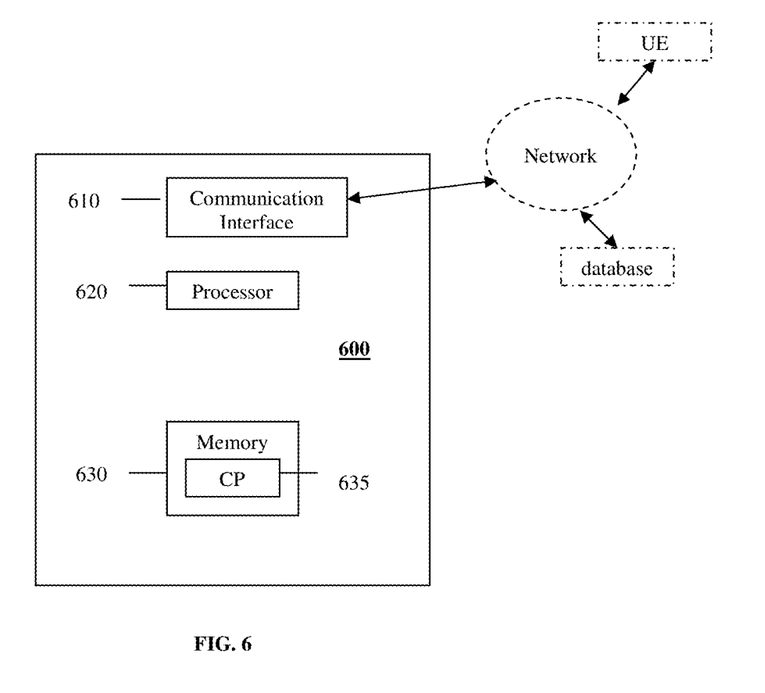
FIG. 6 illustrates a server in accordance with exemplary embodiments.

A server at a network node may similarly build a geo-tree. The server may be accessible to a user equipment over a communication network. A server 600 is illustrated in FIG. 6. Server 600 may include, inter alia, a communication interface 610, processor 620, computer readable medium 630 in the form of memory and a computer program 635. Data items may be stored in memory 630 or made available to server 600 over the network from a database. Processor 620 of server 600 may build a geo-tree according to the methods similar to those described above with reference to the user equipment. The geo-tree, upon being built by server 600, may be communicated by the server 600 via communication interface 610 to a user equipment over a communication network.

In some embodiments, once the geo-tree is created, the tree may be used to determine the location of media items that are tagged with context tags. This may also take place with data or media items (such as images) that are not tagged with geographic information for example.

Exemplary methods as described herein include many advantages. The method may automatically assign a geographical context to all words used as contextual tags in a large set of geo-tagged media and may create geo-related tree structure from these words. The geo-tree structure may be used to determine the geographical context of other texts. The method may find a geographic meaning to words and can also determine "less official" names of places or commonly used slang words relating to a position. For example, New York City is known as the Big Apple, etc. The method may automatically determine which geographical area the words are related to by calculating the areas of the clusters. The information about which geographical areas contain other areas can be used in the determination of geographical context of a text.

It will be appreciated that the procedures (arrangement) described above may be carried out repetitively as necessary. To facilitate understanding, many aspects of the invention are described in terms of sequences of actions. It will be recognized that the various actions could be performed by a combination of specialized circuits and software programming.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method of building a geo-tree structure, wherein a geo-tree corresponds to a logical tree having nodes comprising geographic information, comprising:
    using a plurality of first media items each having at least media, a geographic tag, and a contextual tag to assign geographic information to a second media item having at least media and a contextual tag but without a geographic tag by
    collecting the plurality of first media items;
    associating the geographic tags of the plurality of first media items with the contextual tags of the plurality of first media items, wherein the contextual tags of the plurality of first media items and the second media item include words or terms describing content of the media of the respective one of the plurality of first media items and the second media items, and wherein at least one same word or term of the contextual tags of the plurality of first media items are associated with a plurality of geographic tags;
    clustering the collected first media items based on the association of the geographic tags of the plurality of first media items with the contextual tags of the plurality of first media items;
    classifying the clusters using at least one of the words or terms of the contextual tags of the plurality of first media items;
    building a geo-tree with each classified cluster being associated with a node on the tree, wherein the nodes of the geo-tree comprise geographic information;
    storing the geo-tree on a computer readable medium; and
    assigning the second media item to a cluster in the geo-tree based on words or terms in the contextual tag associated with the second media item matching a word or term of one of the classified clusters so that the second media item is associated with the geographic information of the node of the assigned cluster.

2. The method of claim 1, further comprising:
    collecting the plurality of first media items from one source.

3. The method of claim 1, further comprising:
collecting the plurality of first media items from a plurality of sources, one source at a time.

4. The method of claim 1, further comprising:
storing the associated information.

5. The method of claim 1, wherein the geographic tags include location co-ordinates.

6. The method of claim 5, wherein the clustering comprises:
identifying a plurality of geographic tags associated with a contextual tag; and
calculating an area of a place associated with the contextual tag.

7. The method of claim 6, further comprising:
including a first cluster into a second cluster if a predetermined percentage of the area of the first cluster is included in the area of the second cluster.

8. The method of claim 1, wherein the classification comprises:
assigning a name to each cluster.

9. The method of claim 1, further comprising:
assigning a third media item having a contextual tag to a cluster in the geo-tree.

10. The method of claim 1, wherein the first media items are images or movies.

11. A user equipment comprising:
a transceiver for communicating data;
a memory for storing a plurality of first media items each having at least media, a geographic tag, and a contextual tag; and
a processor for:
using the first plurality of media items to assign geographic information to a second media item having at least media and a contextual tag but without a geographic tag by
associating the geographic tags of the first plurality of media items with the contextual tags of the plurality of first media items, wherein the contextual tags of the plurality of first media items and the second media item include words or terms describing content of the media of the respective one of the plurality of first media items and the second media items, and wherein at least one same word or term of the contextual tags of the plurality of first media items are associated with a plurality of geographic tags;
clustering the collected first media items based on the association of the geographic tags of the plurality of first media items with the contextual tags of the first plurality of media items;
classifying the clusters using at least one of the words or terms of the contextual tags;
building a geo-tree structure, wherein a geo-tree corresponds to a logical tree having nodes comprising geographic information, with each classified cluster being associated with a node on the tree; and
assigning the second media item to a cluster in the geo-tree based on words or terms in the contextual tag associated with the second media item matching a word or term of one of the classified clusters so that the second media item is associated with the geographic information of the node of the assigned cluster.

12. The user equipment of claim 11, wherein the transceiver receives the plurality of first media items from a database over a network.

13. The user equipment of claim 11, wherein the transceiver transmits the geo-tree to a database over a communications network.

14. The user equipment of claim 11, wherein the processor further assigns a third media item having a contextual tag to a cluster in the geo-tree based on a contextual tag associated with the third media item.

15. The user equipment of claim 11, wherein the first media items are images or movies.

16. A server comprising:
a communication interface for communicating data;
a memory for storing a plurality of first media items each having at least media, a geographic tag, and a contextual tag; and
a processor for:
using the first plurality of media items to assign geographic information to a second media item having at least media and a contextual tag but without a geographic tag by
associating the geographic tags of the first plurality of media items with the contextual tags of the plurality of first media items, wherein the contextual tags of the plurality of first media items and the second media item include words or terms describing content of the media of the respective one of the plurality of first media items and the second media items, and wherein at least one same word or term of the contextual tags of the plurality of first media items are associated with a plurality of geographic tags;
clustering the collected first media items based on the association of the geographic tags of the plurality of first media items with the contextual tags of the first plurality of media items;
classifying the clusters using at least one of the words or terms of the contextual tags;
building a geo-tree structure, wherein a geo-tree corresponds to a logical tree having nodes comprising geographic information, with each classified cluster being associated with node on the tree; and
assigning the second media item to a cluster in the geo-tree based on words or terms in the contextual tag associated with the second media item matching a word or term of one of the classified clusters so that the second media item is associated with the geographic information of the node of the assigned cluster.

17. The server of claim 16, wherein the first media items are images or movies.

* * * * *